March 23, 1948.   P. D. GERBER   2,438,392
OSCILLATION GENERATION CONTROL
Filed May 6, 1944   10 Sheets-Sheet 1

*INVENTOR.*
PAUL D. GERBER.
BY
ATTORNEY

March 23, 1948. P. D. GERBER 2,438,392
OSCILLATION GENERATION CONTROL
Filed May 6, 1944 10 Sheets-Sheet 2

*INVENTOR.*
PAUL D. GERBER.
BY H. S. Grover
ATTORNEY.

March 23, 1948.　　　P. D. GERBER　　　2,438,392
OSCILLATION GENERATION CONTROL
Filed May 6, 1944　　　10 Sheets-Sheet 4

INVENTOR.
PAUL D. GERBER.
BY H. G. Grover
ATTORNEY.

INVENTOR.
PAUL D. GERBER.
BY H.S. Grover
ATTORNEY.

March 23, 1948.  P. D. GERBER  2,438,392
OSCILLATION GENERATION CONTROL
Filed May 6, 1944  10 Sheets-Sheet 7

INVENTOR.
PAUL D. GERBER.
BY *H. S. Grover*
ATTORNEY.

March 23, 1948.  P. D. GERBER  2,438,392
OSCILLATION GENERATION CONTROL
Filed May 6, 1944  10 Sheets-Sheet 9

INVENTOR.
PAUL D. GERBER.
BY
ATTORNEY.

March 23, 1948.　　　P. D. GERBER　　　2,438,392
OSCILLATION GENERATION CONTROL
Filed May 6, 1944　　　10 Sheets-Sheet 10

*INVENTOR.*
PAUL D. GERBER.

BY　*H. S. Grover*

ATTORNEY

Patented Mar. 23, 1948

2,438,392

UNITED STATES PATENT OFFICE 2,438,392

OSCILLATION GENERATION CONTROL

Paul D. Gerber, Woodlynne, N. J., assignor to Radio Corporation of America, a corporation of Delaware Application May 6, 1944, Serial No. 534,429

17 Claims. (Cl. 179—171.5)

This application concerns a new and improved means for controlling the frequency of operation of a stabilized oscillator such as, for example, a crystal controlled oscillator in accordance with varying currents or potentials such as, for example, potentials derived for automatic frequency control purposes, signalling current and current of like nature.

An object of the invention is improved control of the frequency of generation of oscillatory energy.

A further object of this invention is improved control in accordance with control energy such as automatic frequency control potentials or signal potentials and the like, of the frequency of generation of oscillatory energy.

An additional important object of my invention is control, in accordance with control or modulation energy, linearly over a wide range of frequencies, of the frequency of generation of oscillatory energy.

The equivalent electric impedance (reactance) of a crystal in the region of resonance is sufficiently flexible to meet oscillation circuit requirements. By inserting a reactance externally in series with the crystal or in parallel with the crystal or both in series and in parallel with the crystal, the crystal will assume a new value of reactance, to compensate for the added reactance, and the network will again meet oscillation circuit requirements. Varying the magnitude of the external reactance will therefore demand a varying crystal reactance. Associated with a varying crystal reactance is a varying frequency in accordance with the reactance versus frequency characteristic of a resonant crystal. Note that herein a crystal such as used in oscillator circuits rather than a resonator crystal such as used in filter circuits is discussed, but the principle involved applies equally well to any type crystal or equivalent stabilizing means.

In accordance with my invention the value of the series or parallel reactance or both is varied in accordance with control potentials or signals. A feature of my invention is an electronic method of varying the magnitude of the external reactance or reactances. Such variation is accomplished by connecting with the external reactance or reactances a reactance tube or tubes the magnitude of reactance of which is varied by varying the magnitude of the grid input to the tube, thereby producing a varying crystal frequency.

In describing my invention in detail reference will be made to the attached drawings wherein.

Figure 1:
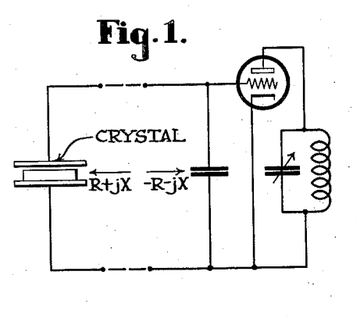
Figs. 1, 3, 4 and 5 are basic diagrams used in explaining the relation of the oscillation generator input impedance with respect to the crystal impedance and the same considered with the series impedance and the shunt impedance and both. Throughout the description reference will be made to crystal reactance and circuit reactance in lieu of impedance. This is warranted by the fact that resistance factor of the impedance is of a negligible magnitude and operation is influenced primarily by the reactance component.
Figure 2:
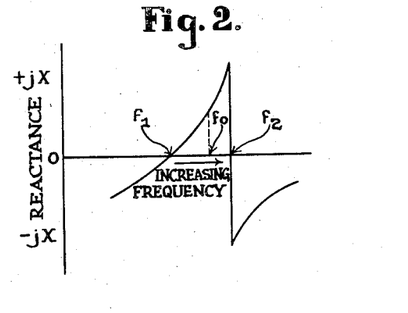
Fig. 2 illustrates the reactance of a crystal as operated herein plotted against frequency.

In the normal operation of a crystal oscillator circuit, the crystal appears as an equivalent $R+jx$ element connected to the grid of the tube, see Fig. 1. By some self-styled manner, the crystal automatically assumes a value of reactance which will satisfy the circuit requirements for oscillations. By reason of the inherent reactance-frequency characteristic of the crystal, the operating frequency will depend upon the value of crystal reactance. A typical characteristic is shown by Fig. 2 where $f_1$ and $f_2$ are the frequencies of series and parallel resonance respectively, and $f_0$ designates an operating frequency. A high inductive value of crystal operating reactance will result in a high operating frequency; a low inductive reactance, a low operating frequency. Thus by changing circuit parameters, for instance the circuit input capacity (within limitations), the crystal reactance and consequently the operating frequency will follow the circuit input reactance change.

If instead of altering circuit parameters as above, an inductor is inserted in series with the crystal (Fig. 3), the reactance of the crystal will immediately assume a lower value of inductive reactance (or if necessary, a capacitive reactance), and consequently, a lower operating frequency, in order for the combination to equal the original required $R+jX$. If the value of the inductor is varied the frequency varies in a corresponding manner.

Likewise, a crystal and inductor in parallel (see Fig. 4) will assume the original value of $R+jX$ by the self-adjustment of the crystal reactance. In this case, the altered crystal reactance characteristic will produce a higher operating frequency. If the value of the parallel inductor is changed, a corresponding change in operating frequency takes place.

Figure 3:
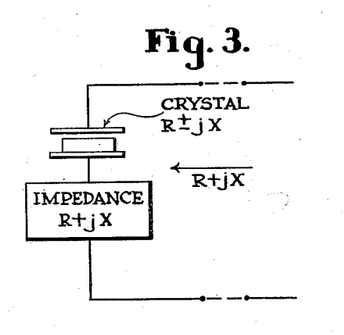

To recapitulate and compare the two conditions, when external reactance is inserted in series with the crystal, Fig. 3, the crystal assumes a new value of reactance on its fixed reactance curve, and the frequency shift is along the fixed crystal characteristic. See Figs. 6a and 6b of the drawings.

Figure 4:
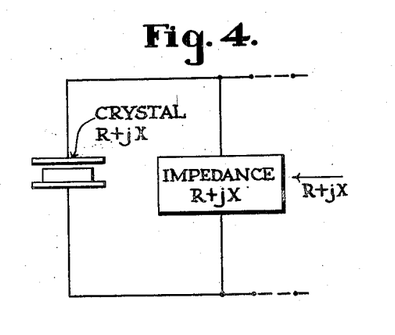

When parallel reactance is added, Fig. 4, the anti-resonant frequency $f_2$ (Fig. 2) increases, but the series resonance frequency $f_1$ remains at the same point. As a consequence, the characteristic is displaced as $f_2$ shifts. In other words, the slope of the crystal and added parallel reactance changes as illustrated in Figs. 6b and 7a. Thus for a required reactance to match the tube the frequency at which this reactance is obtained shifts in proportion to the displacement of the combined characteristics. Since it is difficult to analyze a crystal and parallel reactance separately the characteristic of the combination must be used.

When a reactance is inserted in series with the crystal and a reactance in parallel therewith the characteristic is changed, as well as shifted along (up and down) the changing characteristic. Thus by including, as shown by Fig. 5, both series and parallel elements with a crystal, and controlling their magnitude in a predetermined manner, the crystal frequency can be shifted up and down from its normal operating frequency in accordance with this combined reactance versus frequency characteristic.

Figure 5:
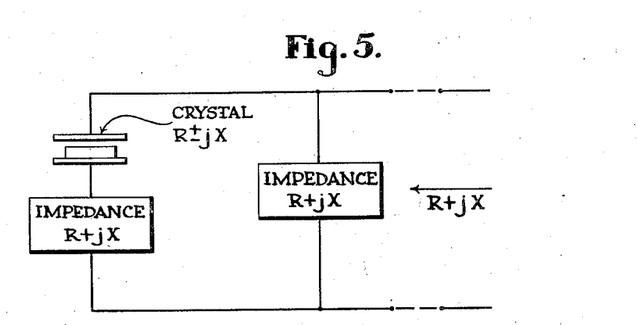

Adjustable inductive and iron core reactors were used in series with the crystal as illustrated in Figs. 3 and 4, and in parallel with the crystal as illustrated in Figs. 4 and 5. The results obtained were good and electronic means was then devised for modulating or varying the external reactances. This leads to the improved arrangement as illustrated in Fig. 6.

Figure 6:
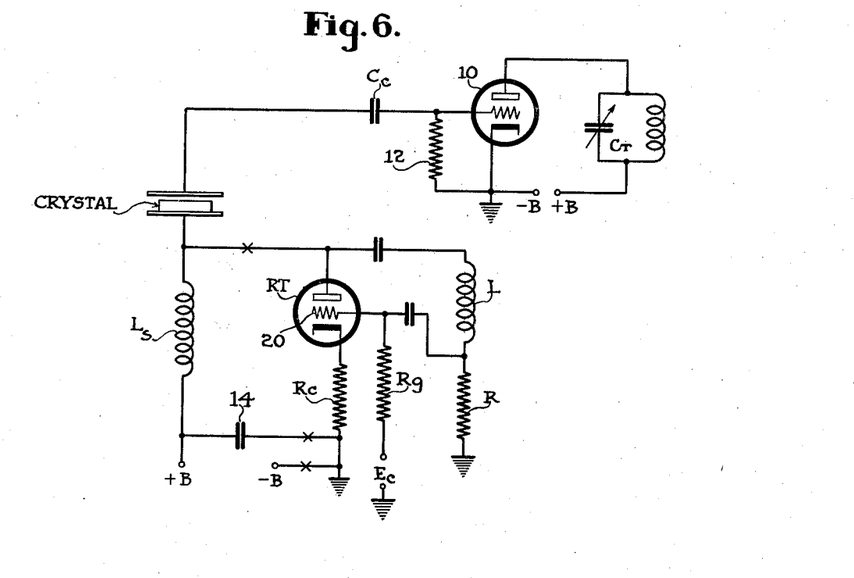
Fig. 6 is a wiring diagram including the essential features of a modulating means and a piezoelectric crystal oscillator arranged in accordance with my invention. In this embodiment the series reactance is modulated by a reactance tube.

In Fig. 6 the electron discharge oscillator tube 10 has its anode connected with a parallel tuned circuit CT and its control grid coupled to its cathode by a biasing resistance 12 and also by a coupling condenser $C_c$, a piezo-electric crystal and an inductance $L_s$ coupled to ground and the cathode by a coupling and direct current potential blocking condenser 14. The character $L_s$ is herein used to designate the inductance in series with the crystal.

The inductance $L_s$ is shunted by the output electrodes of a tube RT which has its control grid 20 coupled to its anode and the end of $L_s$ by a phase shifting network including a blocking condenser, an inductance L and phase shifting resistance R. This network in a well known manner supplies to the control grid 20 of tube RT a voltage shifted in phase substantially 90° with respect to the voltage on the anode of tube RT and at the upper end (in the drawings) of $L_s$. In the sake of simplicity the tube RT is shown as being of the triode type but it will be understood RT may be of any appropriate type. The cathode circuit of RT including a biasing resistance $R_c$ while its grid is supplied, through $R_g$, a negative potential on which the control potential may be superposed. This potential is designated $E_c$. These resistors are considered in reaching the values of L and R necessary to apply a substantially phase quadrature voltage to the grid 20.

In the embodiment illustrated, the voltage on the control grid lags the voltage on the network by about 90° and the tube RT simulates a reactance predominantly inductive. Moreover, the tube reactance is in parallel with $L_s$, and the parallel combination is in series with the crystal, whereby the combined value varies with the current through tube RT and the latter is controlled by the bias on the grid 20. The bias is controlled by control potentials or signals.

As stated above, the input of a conventional tuned plate oscillator circuit is matched by the crystal reactance and here an oscillator type crystal having a high Q is used. The operating frequency corresponding to that matched crystal reactance is a definite frequency as indicated in accordance with Fig. 2 of the drawings. The higher the operating reactance of the crystal the higher the frequency of operation. Now if a reactance such as $L_s$ is put in series with the crystal (the oscillator still demanding the original net input reactance), the frequency of operation will change. The inductance $L_s$ is a finite value, but if too large the crystal will cease to oscillate. However, the crystal X is flexible enough in the region of normal operation to assume almost any reasonable value of reactance, so with $L_s$ in the circuit the crystal takes up a new value of reactance and consequently a new frequency. This has been illustrated in Fig. 6b where it is assumed the frequency of operation with the crystal alone in the circuit is at point A. By adding the inductance $L_s$ the crystal which heretofore alone matched the reactance of the oscillator tube input now takes up a new value so that the oscillator tube input is again matched by the net reactance of the crystal and $L_s$. By virtue of the crystal reactance-frequency characteristic the frequency at which it oscillates drops and the system now operates at a frequency lower than it operated at before, say at point B.

If the reactance of $L_s$ is made more than the reactance of the crystal the crystal will take on the characteristics of a negative reactance to again match the net reactance of the crystal network to the input reactance of the tube.

As a specific example, assume that the oscillator tube 10 requires input reactance of the order of 2,000 ohms. Then the reactance of the resonant crystal X is 2,000 ohms and inductive, and say oscillations are generated at about 5 megacycles. Now if $L_s$ of 2,000 ohms is placed in series with the crystal, the crystal reactance will assume a substantial zero value so that the net impedance of the crystal and $L_s$ is again 2,000 ohms. The frequency of the oscillations now drops because of the characteristic, to say, 5 megacycles minus 1,000 cycles, point C.

Now if $L_s$ is made to have a reactance of 4,000 ohms, the crystal characteristic being fixed, the reactance of the crystal becomes minus 2,000 ohms and the frequency of the operation drops to say, 5 megacycles minus 4,000 cycles, point D. It is seen that the crystal X per se now is a negative reactance.

Thus the crystal may be said to have a negative reactance characteristic the value of which is such as to cancel part of the reactance of $L_s$ added to the series circuit to produce the net inductive reactance, X net, required by the tube input. Since the crystal reactance $X_x$ for maximum frequency output is equal to the maximum net reactance of the network the frequency change is downward, and the amount of frequency swing downward is mainly determined by the magnitude of $L_s$.

The tube RT controls the effective reactance of $L_s$ and when the tube RT is controlled by signals the generated oscillations are modulated. The limit of downward shift might be determined by the ability of the oscillator to start if interrupted at a point remote from its normal or starting frequency. However, if on all occasions the starting of the circuit were to take place when the effective value of $L_s$ is small (frequency corresponding to point G of Fig. 6b), the maximum swing downward may satisfactorily reach a value in excess of 1% of the crystal frequency.

If we let $L_e$ represent the complex impedance between the output electrodes of RT and $L_s$ in parallel then when the tube RT impedance equals substantially zero, $L_e$ plus $L_s$ is substantially zero. When the RT tube impedance is infinity $L_e$ plus $L_s$ is equal to $L_s$. Thus the reactance in series with the crystal is variable between substantially zero and the value of $L_s$.

Figure 6A:
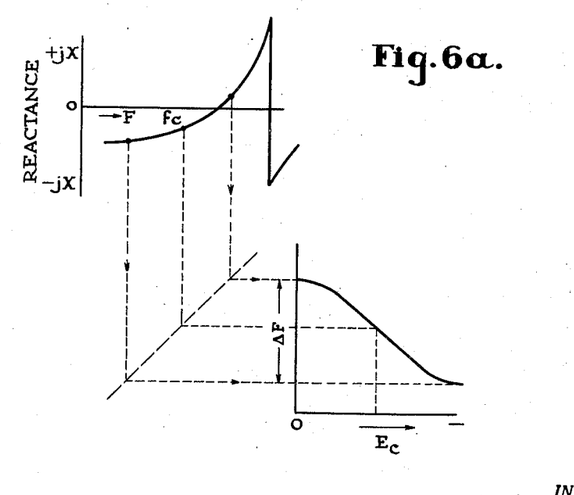
Figs. 6a, 7a, 8a, 9a and 10a, respectively, are curves wherein the reactance versus frequency characteristics of the crystal as used in the embodiments of Figs. 6, 7, 8, 9 and 10, respectively, are shown. These curves are used to illustrate the operation of the embodiments in Figs. 6, 7, 8, 9 and 10.
Figure 6B:
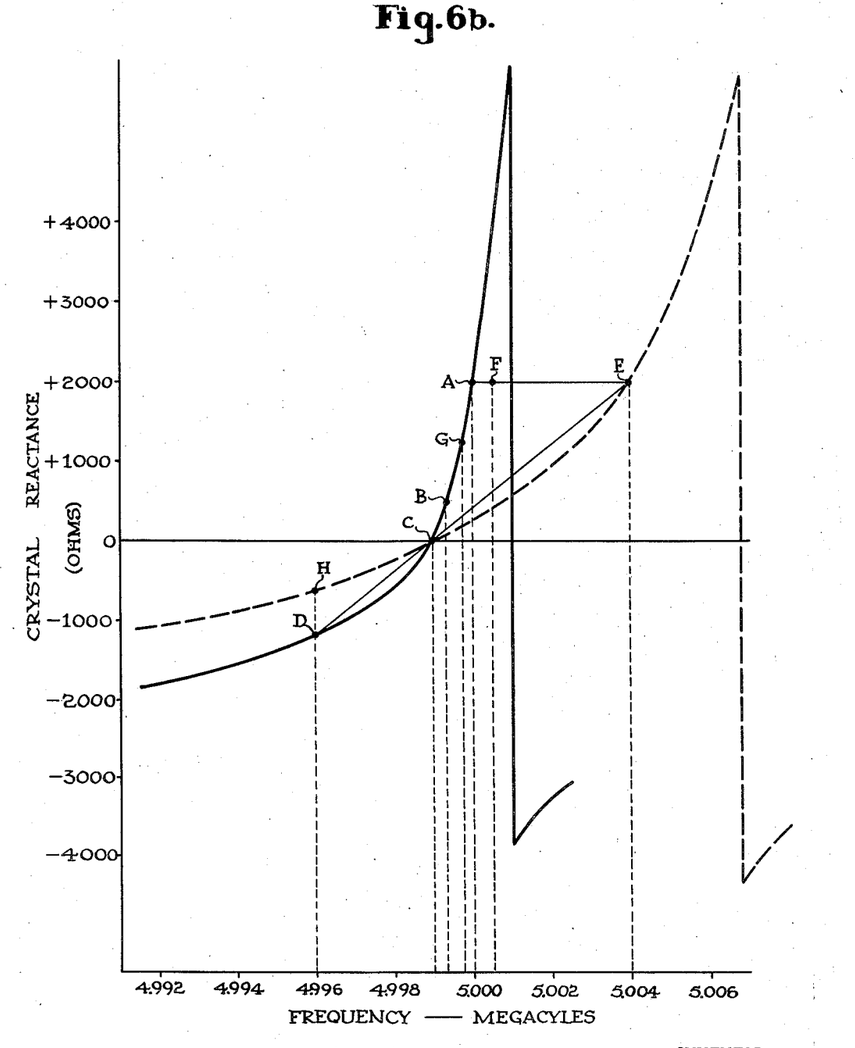
Fig. 6b illustrates also by reactance versus frequency characteristic the operation of my improved system when an inductance of controllable value is inserted in series with the crystal as in Fig. 6, and also when an inductance of controllable value is put in parallel to the crystal as in Fig. 7. This figure also is used to illustrate the operation of the combined arrangement of Fig. 8.

The operation of the embodiment of Fig. 6 is illustrated by the functional curve diagram of Fig. 6a. As the control bias $E_c$ of the tube RT is varied in a negative direction (from zero bias) the reactance of the tube RT increases, as does the reactance $L_e$ of $L_s$ and RT in parallel and the reactance of the crystal decreases so that the point of oscillation slides down along the reactance versus frequency characteristic. $\Delta F$ designates the range of frequency variation between a maximum when the reactance of RT is substantially zero and a minimum when the impedance of RT is infinity. The tube RT is biased between cutoff and zero at the carrier or mean frequency $f_c$.

Figure 7:
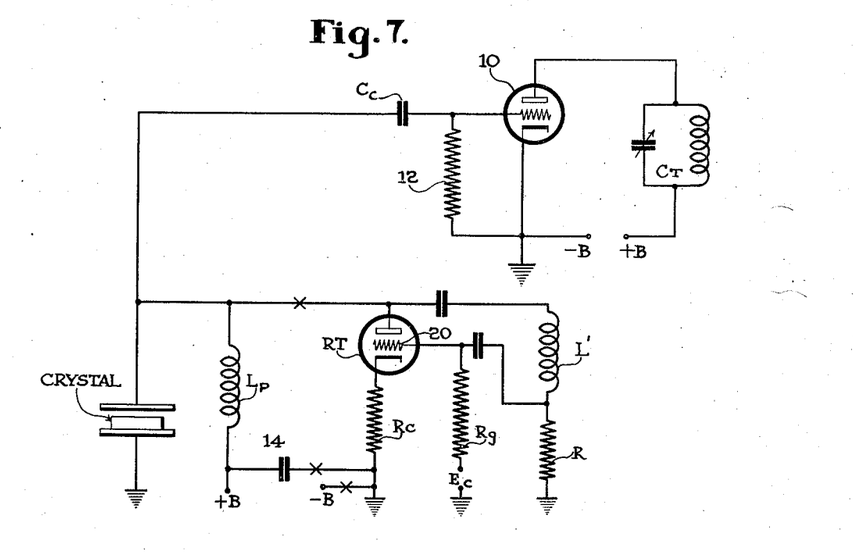
Fig. 7 is a circuit diagram including the essential features of a modulating means for a crystal oscillator as described hereinbefore briefly. In this embodiment the reactance tube modulator shunts the piezo-electric crystal.
Figure 7A:
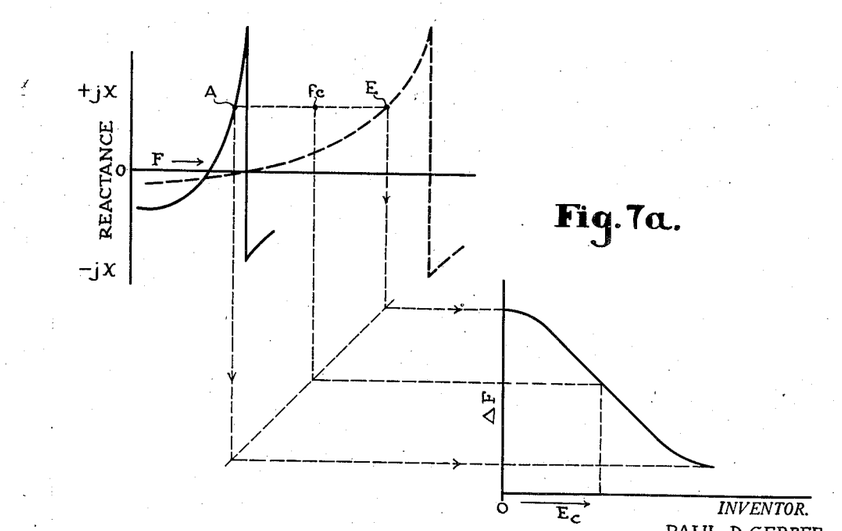

In the embodiment of Fig. 7, the inductive reactance $L_p$ shunted by the variable inductive reactance provided by the tube RT is in parallel with the crystal, so that the tube reactance is matched to a network of two reactances in parallel. Under the circumstances the crystal characteristic is extended as indicated by dotted lines in Fig. 6b of the drawings. Now with the parallel inductance $L_p$ added, and the resultant frequency-reactance characteristic extended, the operating frequency for matched reactances will increase. The degree of extension is inversely related to $L_p$. That is, the smaller $L_p$ the greater the extension. For example, again take the oscillator required input reactance as 2,000 ohms, the operating frequency will be increased to 5 megacycles plus 4,000 cycles, point E or to some intermediate point along the line AE dependent upon the magnitude of $L_p$.

It will be seen that $L_p$ cannot go to zero because the operating frequency would then approach infinity and the system would not work. Also, a low reactance would introduce essentially a short-circuit across the crystal. Therefore, $L_p$ is a finite value such as to determine the minimum effective value of $L_p$, and in the conventional manner the modulation is in a downward direction, say from point E where the effective value of $L_p$ is small as determined by the effect of the reactance tube circuit, to point F approaching point A on the line AE. Where the effective value of $L_p$ is $L_p$ itself which is many times larger than the crystal reactance at point A.

The diagram of Fig. 7a is illustrative of the function of the system of Fig. 7. Note that the characteristic is extended or shifted to the right, as shown by the dotted line, when the parallel reactance $L_p$ is added. As the value of $L_p$ is reduced the frequency of operation increases. $L_p$ is reduced as the bias $E_c$ on the tube RT swings toward zero and increased as $E_c$ swings more negative. In this embodiment the full line curve represents the characteristic of the crystal alone or with $L_p$ very large, while the dotted curve represents the characteristic as extended by reducing $L_p$ from this very high value. At carrier or mean frequency the tube RT has a bias $E_c$ of a value between cutoff and zero bias.

Figure 8:
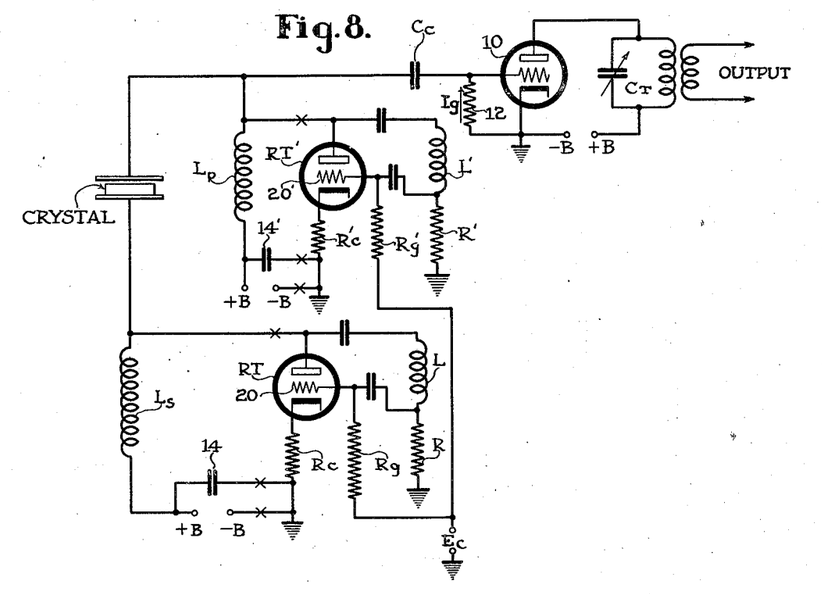
In Fig. 8 is a circuit diagram illustrating the essential features of an embodiment which includes two tubes, one of which shunts the crystal and the other is in series with the crystal, that is, the reactance of the crystal circuit, and whereby the principle of operation is obtained by the two tubes functioning in parallel.

In the embodiment of Fig. 8, both series and shunt impedances $L_s$ and $L_p$ respectively are used. The operation of this embodiment, it is believed, will be clear from the foregoing description.

In the parallel embodiment of Fig. 7, when the reactance $L_p$ is infinity the system operates at the crystal frequency point A (Fig. 6b), or substantially at this frequency. In the series arrangement of Fig. 6, when $L_s$ is zero the crystal oscillation operates at the crystal frequency point A (Fig. 6b), or substantially so. For the combined embodiment of Fig. 8 then when the effective reactance of $L_p$ is decreased the frequency goes up, as does the frequency when the effective reactance of $L_s$ is decreased. Referring again to Fig. 6b, in combination, when the effective values of $L_p$ and $L_s$ are decreased simultaneously the frequency change will be upward from point D to point E essentially along the line DE, or conversely, when the effective values of $L_p$ and $L_s$ are increased simultaneously the frequency change will be downward from point E to point D essentially along the line DE.

Figure 11:
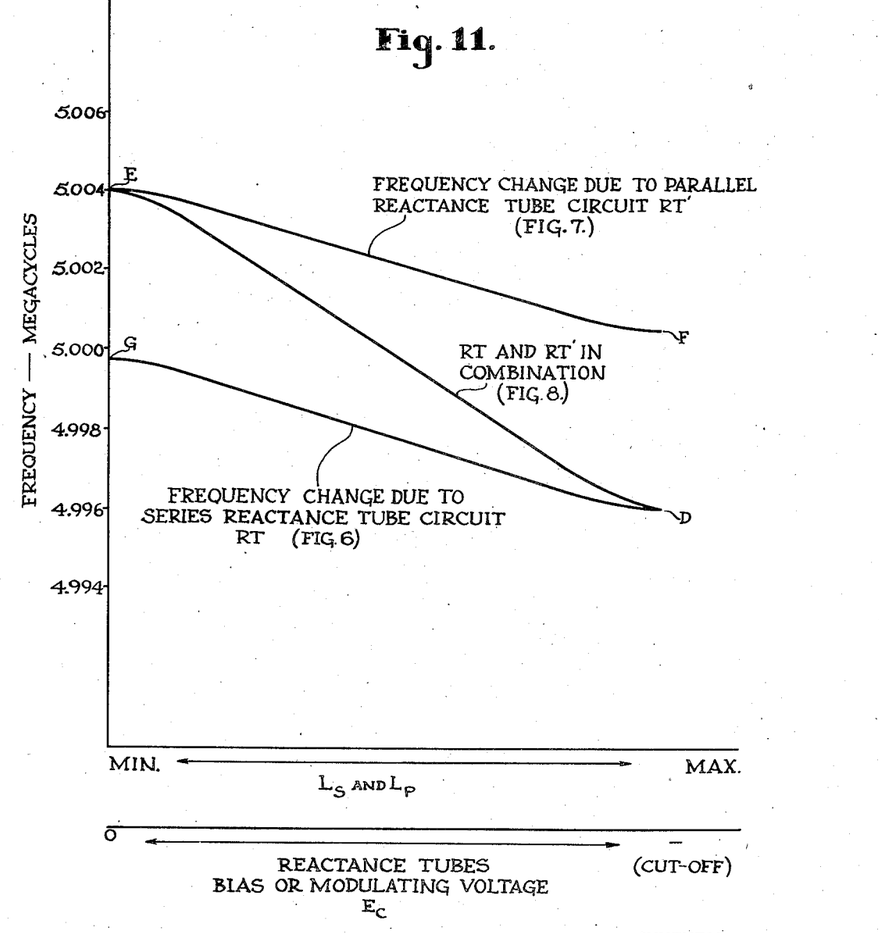
Fig. 11 is also used to illustrate the operation of the arrangements of Figs. 6, 7 and 8. In this figure frequency is plotted as ordinates and values of $L_s$ and $L_p$ and bias $E_c$ for the tube or tubes RT as abscissa.

The effect upon frequency by varying the effective reactances of $L_p$ and $L_s$ by means of bias (signal) voltage is illustrated by Fig. 11. The lettered points correspond to those of Fig. 6b. As a consequence, the impedances $L_p$ and $L_s$ are modulated in parallel. The modulating potentials then are applied to the controlling electrodes of tubes RT and RT' in parallel.

Referring again to Fig. 11, the linearity of the frequency change EF depends upon and can be controlled by the reactance tube circuit RT' parameters—$L_p$, $L'$, $R'$, operating potentials, and type of tube. The linearity of the frequency change GD of reactance tube circuit RT can similarly be controlled by selection of parameters embodied in its circuit. Thus by adjustments which control the frequency slope of the series and parallel reactance tube circuits, linearity over essentially the entire bias range can be obtained when operated in combination.

Figure 8A:
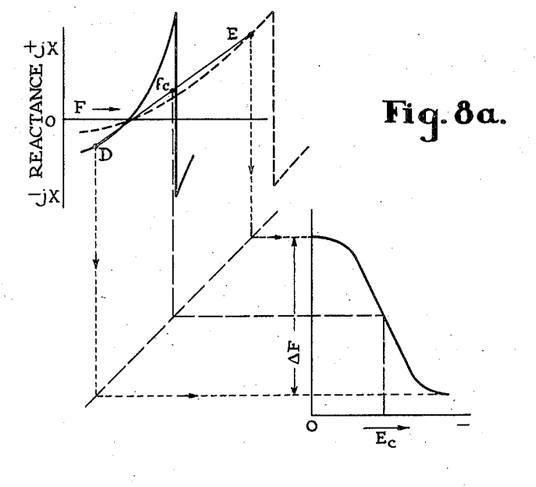

The functional diagram of the embodiment of Fig. 8 is in Fig. 8a. Study of this figure shows that the operation is as in Fig. 6a, supplemented by the operation in Fig. 7a. In Fig. 8a, the full line curve represents the characteristic with $L_s$ in series with the crystal, while the dotted line curve shows the characteristic with $L_p$ in parallel with the crystal. The limits of $\Delta F$ are extended considerably. The effect is in a sense similar to an increase of the slope of the characteristics of the reactance tubes. The frequency at which the system operates for different values of $E_c$ falls along the line DE. As $E_c$ becomes less negative or approaches zero the frequency increases. Mean or carrier frequency is again obtained when $E_c$ is of a value between zero and cutoff bias.

In setting up the embodiment in Fig. 8, the following procedure should be followed. The oscillation generator is set up to operate at the normal crystal frequency assuming L and L' and R and R' are as desired and fixed by development.

Then to line up the set, open the shunt reactance, that is, disconnect $L_p$ from the crystal at its high potential end. Short the series reactance preferably by a capacitor of high capacitance to avoid shorting the D. C. anode potential, and tune the oscillator circuit CT for maximum grid current, $I_g$. The short around $L_s$ is removed and $L_s$ adjusted for the desired tuning frequency swing, that is, peak negative or down swing with bias (signal) voltage $E_c$ equal to cutoff value. Then short $L_s$ and reconnect $L_p$ and adjust $L_p$ for the desired up swing, that is, in accordance with peak frequency with bias (signal) voltage $E_c$ equal zero. The short around $L_s$ is then removed and the modulation applied.

Because of the coupling of the two reactance circuits (Fig. 8) through the crystal capacity, it is necessary to make slight readjustments with both connected to obtain the desired frequency swing.

In the operation of the arrangements of Figs. 6, 7 and 8 for symmetrical control or modulation about a center frequency, it is necessary to adjust the reactance tube circuits to a fixed bias whereby the control potential or modulating signal will increase or decrease about this fixed bias to produce symmetrical up and down frequency changes about said selected center frequency. This will be apparent by inspection of the curves and in particular by inspection of the functional diagrams of Figs. 6a, 7a and 8a.

It was found by further experiment and practice that improved center frequency stability is obtained by operating the reactance tubes differentially whereby the center or mid-frequency point of operation of the reactance tubes is located in the region of cutoff bias for the said tubes. Such operation not only resulted in a more stable frequency but also reduces amplitude modulation and provides a relatively wide swing or deviation of the frequency by the control potentials, which deviation and/or swing is substantially linear. An embodiment including these features and others is shown in Fig. 9 with a functional diagram of the operation thereof in Fig. 9a.

Figure 9:
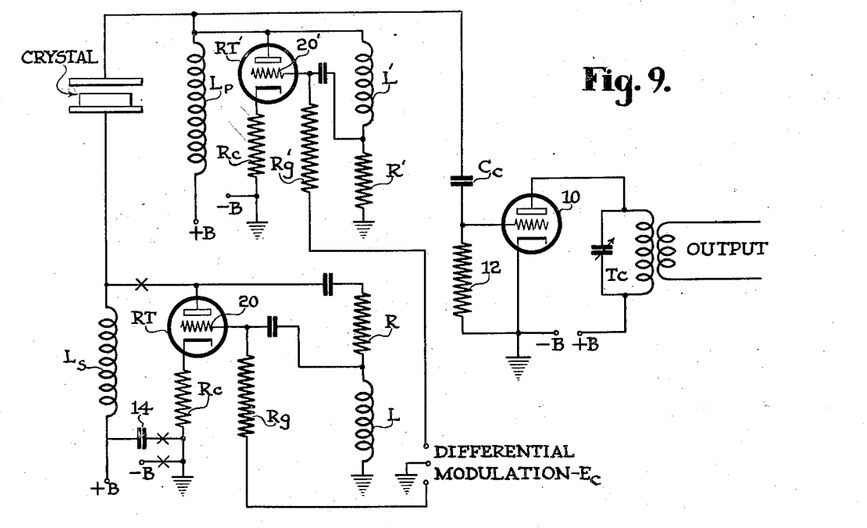
Fig. 9 illustrates by a basic wiring diagram the essential features of a generator with a crystal in a circuit between the grid and cathode, with a reactance tube in series with the crystal and a second reactance tube in shunt to the series arrangement, and with the reactance tubes controlled differentially or in pushpull by the control potential.
Figure 9A:
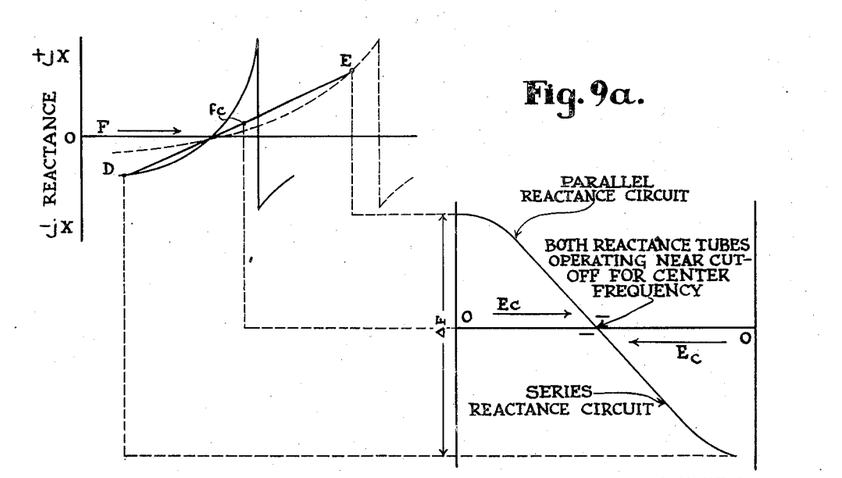

In contrast to parallel operation as in Fig. 8, where the frequency is caused to shift downward by both reactance tube circuits as their bias is shifted in the direction from zero bias toward cutoff, differential operation of the reactance tubes as in Fig. 9 requires one of the reactance tubes to produce the opposite effect. That is, one of the reactance tubes is to produce a downward change of frequency as its bias is shifted in the direction from zero toward cutoff, while the other reactance tube produces a frequency shift which is upward as its bias is shifted in the direction from zero bias to cutoff bias. Or, as the bias $E_c$ of one tube changes from zero to cutoff, the frequency change is downward and this frequency change continues downward as the bias $E_c$ on the other reactance tube changes from cutoff bias toward zero bias. Thus in differential or opposed operation the center frequency is in the region of cutoff bias for both tubes, whereby the modulating signal in one direction will cause the frequency to change upward, for example, by the control exerted on the parallel reactance tube circuit, while the modulation signal in the other direction will cause the frequency to change downward, for example, by the control exerted on the series reactance tube circuit.

In Fig. 9, as in the prior figures, tube RT controls the series reactance being in shunt with $L_s$ while tube RT' controls the parallel reactance being in shunt to $L_p$. In order to obtain this differential control the tube RT now has its anode connected to its grid by a resistance R and its grid connected to its cathode by an inductance L so that the tube RT has its grid 20 excited by a radio frequency voltage which leads the phase of the anode radio frequency voltage so that the tube simulates a reactance predominantly capacitive for reflection into the series reduction $L_s$.

The reactance tube RT' is in many respects similar to the reactance tube RT of say Fig. 6, and produces or simulates a reactance predominantly inductive in nature for reflection into the inductance $L_p$. The control potentials $E_c$ are varied differentially, that is, one goes up while the other goes down and vice versa. The differential feed may be through a transformer secondary winding connecting the grids of RT and RT' in pushpull relation with the primary winding connected with a modulation source or amplifier or by a high impedance feed coupling from a pushpull stage output differentially to the grids of RT and RT'.

Figure 12:
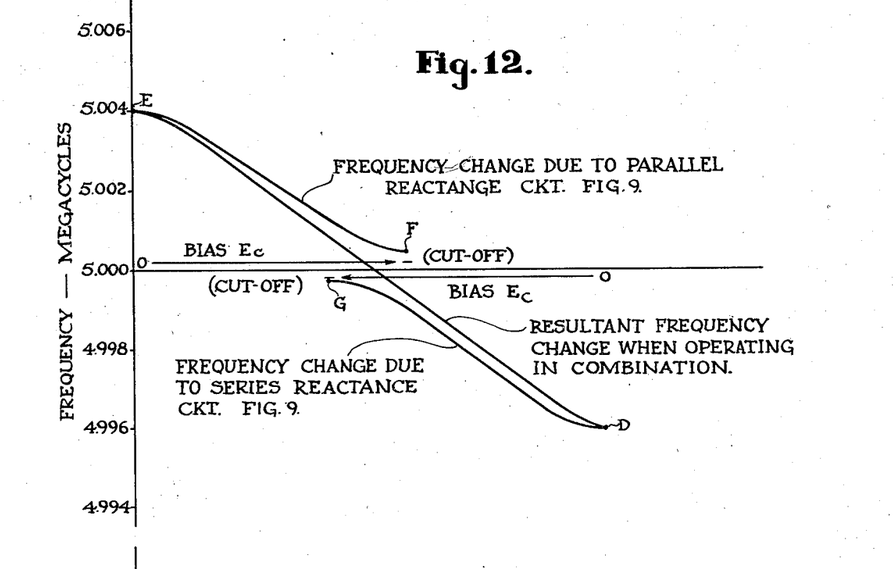
Fig. 12 shows curves somewhat similar to the curves of Fig. 11, illustrating the operation of the arrangement of Fig. 9. In this figure frequency is plotted as ordinates against bias $E_c$ applied to the reactance tubes.

The differential operation of the arrangement of Fig. 9 will be apparent by referring to Fig. 12 of the drawings wherein the characteristics of Fig. 6b are transformed to differential operation. The lettered points of Fig. 12 correspond to the lettered points of Fig. 6b. The operation is also shown in the functional diagram of Fig. 9a. Where $f_c$ indicates mean or carrier frequency, $E_c$ is the control bias and $\Delta F$ is the deviation range.

Figure 10:
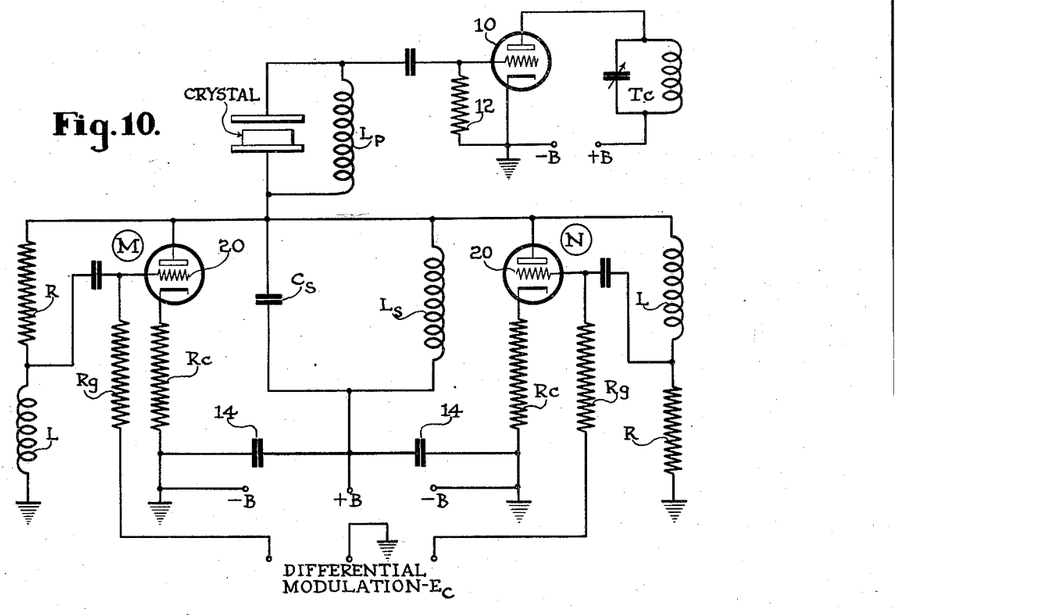
Fig. 10 is a modification of the prior arrangements wherein two reactance tubes are arranged in series with the crystal and controlled differentially or in pushpull. In this embodiment a fixed reactance $L_p$ is across or in shunt to the crystal.

In order to derive the advantages of differential modulation or control by two reactance tubes of a system, as illustrated in Fig. 6, an arrangement as illustrated in Fig. 10 is used. In this embodiment differential control by two reactance tubes is used in a series arrangement. In the arrangement of Fig. 6 wherein the reactance $L_s$ is in series with the crystal and modulated by a single reactance tube RT the reactance tube bias must be selected at a point between zero and cutoff to establish a center frequency $f_c$ about which control or modulation takes place. In the differential arrangement of Fig. 10 the center frequency of operation occurs as in Fig. 9, in the region of cutoff of the reactance tubes thereby insuring more stable operation.

In this embodiment the crystal is in series with $L_s$ which is shunted by a condenser $C_s$. The reactance tube designated generally at M simulates a capacity reflected into or added to $C_s$ while the reactance tube designated generally at N simulates an inductance reflected in or added to the inductance $L_s$. The entire effect is a parallel circuit comprising controllable capacity and inductance.

Figure 10A:
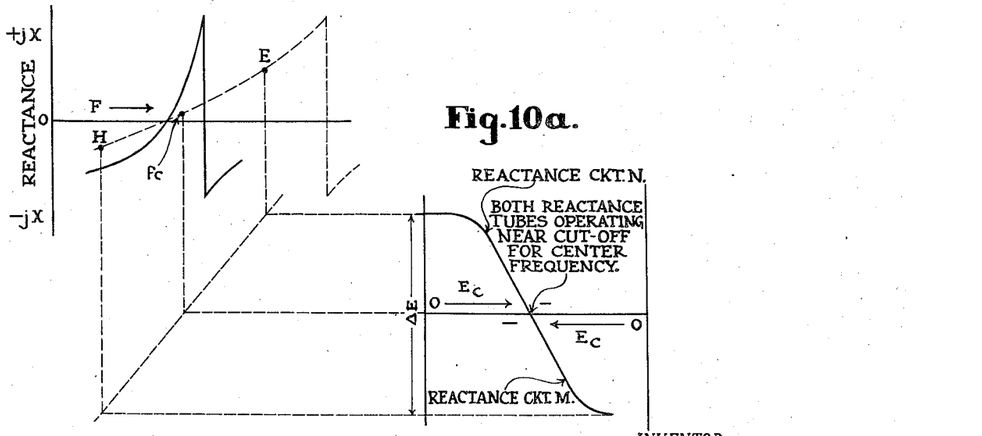

In this embodiment the equivalent series reactance is composed of $L_s$ and $C_s$ in parallel and the combination is predominantly inductive. The operation of the circuit of M of Fig. 10 is such that when the biased voltage $E_c$ is changed in the direction $E_c$ equals zero to $E_c$ equals cutoff the effective value of $L_s$ and $C_s$ in parallel is reduced and the frequency of the system increases. This is shown in the functional diagram Fig. 10a.

The operation of the circuit designated generally at N of Fig. 10 is such that when the bias voltage $E_c$ is changed in the direction $E_c$ equals zero to $E_c$ equal cutoff the effective value of $L_s$ and $C_s$ in parallel is increased and the frequency decreases. Thus, when operated differentially, that is, when the control potential $E_c$ is applied differentially to the control grids of the two tubes as the bias $E_c$ of one tube changes from zero to cutoff the frequency changes downward, and as the bias $E_c$ of the other tube changes from zero to cutoff the frequency change is upward. Thus, the modulating signal in one direction from center-frequency bias or point of operation will cause the frequency to increase, while variation of the modulating signal or control potential in the other direction will cause the frequency to decrease.

Referring to Fig. 6b, the range of operation with $L_p$ of Fig. 10 omitted falls on the characteristic ACD, and the maximum frequency swing upward will approach point A, say point G. Thus, for wide frequency swings the center-frequency will appear for instance at point D. For symmetrical modulation, obviously the downward swing will be the equivalent of the up distance DG, but to the left of D on the characteristic ACD. Now, the greater the separation of center-frequency point of operation (point D) from the operating frequency of the crystal in a conventional oscillator circuit (point A), the more unreliable becomes the performance of the system. That is, if the reactance of the center-frequency point of operation is capacitive (below point C) then the system becomes critical in operation. Therefore, it is desirable to extend the crystal characteristic to assume the dotted characteristic curve ECH. This is accomplished by inserting the reactance $L_p$ in shunt to the crystal of Fig. 10. The center-frequency point of operation will now appear closer to point A, say at point C, and the frequency swing will be along the line ECH about point C in differential operation as herein described.

Figure 13:
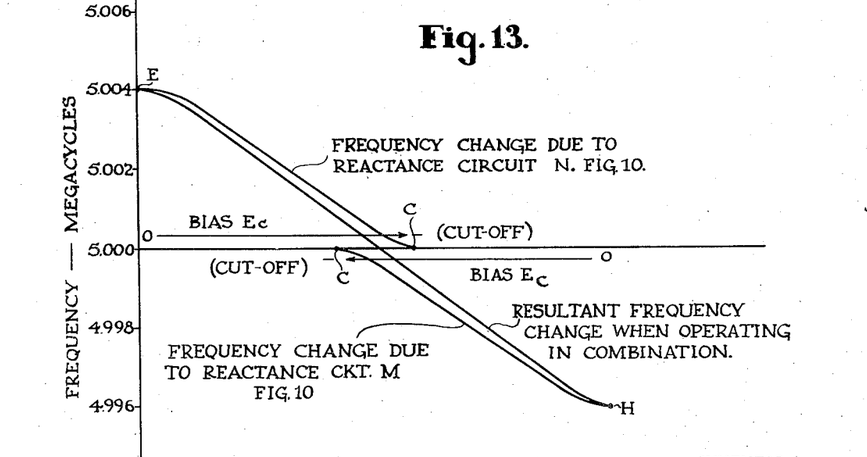
Fig. 13 illustrates by curves operation of the arrangement of Fig. 10. This figure is similar in some respects to Fig. 12.

By suitable adjustment of the circuit constants of the reactance circuits M and N of Fig. 10, performance and operation curves such as shown by Fig. 13 are obtained.

Other forms of reactance tubes RT may be used in the various circuits provided certain requirements are met.

In the arrangement of Fig. 6, the tube RT has a phase shifting circuit LR such that the tube simulates a reactance inductive in character, and reflects inductance into $L_s$. The tube RT, as a consequence, may be of any type provided the reactance reflected into $L_s$ is inductive in character. For example, a reactance tube of the nature illustrated in Fig. 14 where R is coupled between the plate and grid and C is coupled between the grid and cathode, so that the voltage on the grid 20 lags the plate voltage, may be used. To make this change, the connections are interrupted at the points marked with crosses and the substitution is made.

Figure 14:
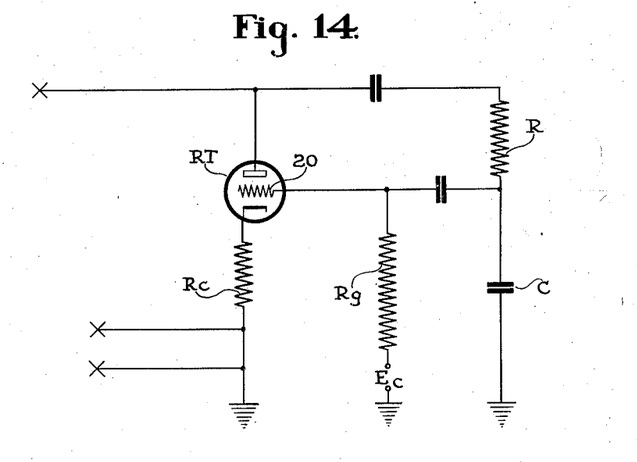
Figs. 14 and 15 illustrate alternative reactance tube arrangements for use in certain of the modifications described hereinbefore, to replace the reactance tubes therein.

In the modification of Fig. 7, the tube RT again reflects reactance predominantly inductive into the parallel inductance $L_p$, and this tube RT may be replaced by any tube simulating reactance predominantly inductive, such as, for example, the arrangement of Fig. 14.

In a similar manner, inspection of the arrangement of Fig. 8, wherein the reactance tubes RT' and RT are modulated in synchronism by control potentials $E_c$, and the tubes reflect inductive reactance in the inductances $L_s$ and $L_p$ respectively, shows these tubes may be replaced by other type reactance tubes, such as, for example, as illustrated in Fig. 14.

In the embodiment of Fig. 9, the control by the modulation or control potentials $E_c$ is differential or in opposition, the tube RT reflects into $L_s$ a reactance predominantly capacitive, so that in effect we have an inductance L shunted by a variable capacitive reactance to provide a resultant reactance inductive in character and of variable inductance. The tube RT' is inductive in character. RT may be replaced by any appropriate reactance tube, such as, for example, by a reactance tube arrangement as illustrated in Fig. 15, while the tube RT' may be replaced by any appropriate reactance tube, such as, for example, as illustrated in Fig. 14.

Figure 15:
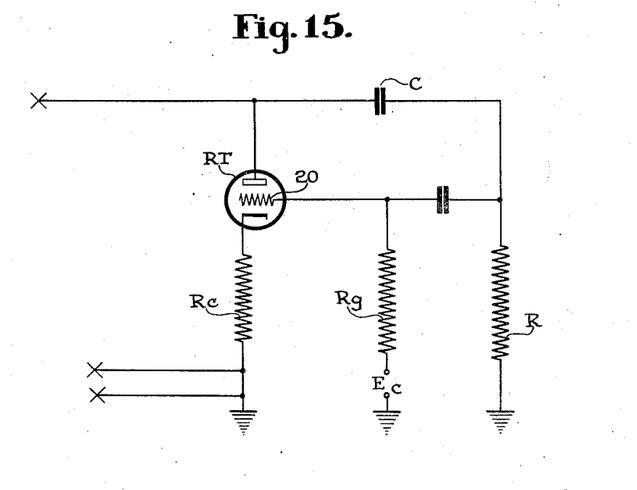

In the embodiment of Fig. 10, the reactance tube M is capacitive in character, while the reactance tube N is inductive in character, so that the reactance tube at M may be replaced by an arrangement such as shown in Fig. 15, while the tube at N may be an arrangement such as shown by Fig. 14.

I claim:

1. In apparatus for controlling the frequency of operation of a generator of the type wherein a crystal is in shunt to the control grid to cathode impedance of an electron discharge device, the apparatus comprising an inductance in series with said crystal for altering the point of operation of the crystal on its frequency versus reactance characteristic, a tube having an anode coupled to a point of high radio frequency potential on said inductance and having a grid coupled to its anode by a phase shifting network and having a cathode coupled to a point, of low radio frequency potential, on said inductance, said tube and its connections being arranged and operated to provide a simulated inductance in shunt to said first named inductance, of a value depending on the tube conductance, and connections for controlling the tube conductance in accordance with control potentials.

2. In a control for a tube generator of the type wherein the tube has two electrodes coupled by a piezo electrical crystal, a reactance in series with the crystal in said connection, a reactance in shunt to the crystal and first reactance, and means for varying the values of said reactances simultaneously in accordance with the control potentials to correspondingly vary the frequency of operation of the generator.

3. In apparatus for controlling the frequency of operation of a generator of the type wherein a crystal is in shunt to the control grid to cathode impedance of an electron discharge device, the apparatus comprising a variable inductance and a variable capacity in series with the crystal for altering the point of operation of the crystal on its frequency versus reactance characteristic, and means for controlling the varying inductance and the capacity differentially in accordance with control potentials.

4. In a variable frequency generating system of the type wherein a tube has electrodes including a cathode and a grid connected in oscillation generating circuits including a piezo electric crystal connected in a circuit between the grid and cathode, the reactance of the said crystal substantially matching the reactance between the grid and cathode, an inductive reactance in said circuit with said crystal for altering the frequency versus reactance characteristic on which the crystal operates and as a consequence its frequency operation, a tube having an anode coupled to a point of high radio frequency potential on said inductance and having a control grid coupled to its anode by a phase shifting network and a cathode coupled to a point of low radio frequency potential on said inductance to provide a simulated reactance in shunt to said inductance to change the value thereof, the arrangement being such that the reactance of the crystal changes as the reactance of the inductive reactance is changed to maintain said substantially matched reactance, and means for varying the value of said inductive reactance by varying the tube conductance in accordance with control potentials.

5. In apparatus for controlling the frequency of operation of a generator of the type wherein a crystal is in shunt to the control grid to cathode impedance of an electron discharge device, the apparatus comprising two tubes in parallel, one simulating a capacity the other an inductance, both variable and of values depending upon the tube conductances, connections including the parallel combination in series with the crystal for altering the frequency versus reactance characteristic on which the crystal operates, and connections for differentially modulating the tube conductances in accordance with signals.

6. In apparatus for controlling the frequency of operation of a generator of the type wherein a crystal is in shunt to the control grid to cathode impedance of an electron discharge device, the apparatus comprising two tubes in parallel, one simulating a capacity the other simulating an inductance, the capacity and inductance being of a value depending on the tube conductances and variable, connections for including the parallel arrangement in series with the crystal for altering the point of operation of the crystal on its frequency versus reactance characteristic to the desired operating point when the tubes are biased to cutoff, means for biasing said tubes to cutoff, and means for modulating the conductances of the tubes differentially in accordance with signals.

7. In apparatus for controlling the frequency of operation of a generator of the type wherein a crystal is in shunt to the impedance between two electrodes of an electron discharge device, the apparatus comprising an inductance in series with the crystal for altering the point of operation of the crystal on its frequency versus reactance characteristic, an inductance in shunt with the crystal and the series inductance for shifting the frequency versus reactance characteristic of the arrangement including the crystal, and means for controlling the value of said inductances in accordance with signals.

8. In apparatus for controlling the frequency of operation of a generator of the type wherein a crystal is in shunt to the impedance between two electrodes of an electron discharge device, the apparatus comprising an inductance and a variable effective capacity in parallel in series with said crystal for altering the point of operation of the crystal on its frequency versus reactance characteristic, a variable inductance in shunt to said crystal and series combination for shifting the reactance versus frequency characteristic of the arrangement including the crystal, and connections for differentially varying the capacity and inductance in accordance with signals.

9. In apparatus for controlling the frequency of operation of a tube generator of the type wherein a tube has a control grid and cathode with a piezo-electric crystal in series between the control grid and cathode and an anode coupled to the cathode by a parallel tuned circuit, two-tube reactances each having output electrodes between which a reactance appears of a value depending on the intensity of the current through the tube, leads coupling the output electrodes of one tube reactance in series with the crystal, leads coupling the output electrodes of the other tube reactance in shunt to said crystal and said reactance in series, and connections for varying the alternating current through the two additional tubes in accordance with control potentials.

10. In a control apparatus for a tube generator of the type wherein the tube has an anode, a grid and a cathode with a piezo-electric crystal between the grid and cathode and a circuit parallel tuned to a frequency above the natural fundamental frequency of the crystal connected between the anode and cathode, said control apparatus including a reactance in series with the crystal, a control tube having an anode coupled to a point on said reactance of high radio frequency potential and having a control grid coupled to its anode by a phase shifting network, and having a cathode coupled to a point on said reactance of low radio frequency potential so that a simulated reactance in shunt to said first reactance is developed of a value depending on the current through the control tube, and connections to a control tube electrode for controlling the current through the tube in accordance with control potentials.

11. In a control for a tube generator of the type wherein the tube has an anode, a grid and a cathode with a piezo-electric crystal between the grid and cathode and an anode in a circuit parallel tuned to a frequency above the natural fundamental frequency of the crystal, the crystal reactance substantially matching the reactance between the grid and cathode, the frequency of the oscillations generated being determined by the crystal reactance, an inductance in series with the crystal, the arrangement being such that the crystal reactance changes as the value of the inductance is changed, a variable reactance shunting said inductance, said variable reactance comprising a tube having output electrodes including an anode shunting the inductance and having a control grid coupled to its anode by a phase shifting network, and connections to an electrode of the tube for controlling the current through the tube to thereby control the crystal reactance and the frequency of the oscillations generated.

12. In apparatus for modulating the frequency of operation of a generator of the type wherein a crystal is in shunt to the control grid to cathode impedance of an electron discharge device, the apparatus comprising an inductance in series with the crystal, an inductance in shunt to the crystal and series inductance, a pair of electron discharge tubes, connections for operating one of said tubes as a simulated inductance in shunt to said first named inductance, connections for operating the other of said tubes as a simulated inductance in shunt to said second named inductance, and connections for controlling the conductivity of the tubes in phase in accordance with signals.

13. In apparatus for modulating the frequency of operation of a generator of the type wherein a crystal is in shunt to the impedance between two electrodes of an electron discharge device, the apparatus comprising an inductance in series with the crystal, an inductance in shunt to the crystal and series inductance, a pair of electron discharge tubes, connections for operating one of said tubes as a simulated capacity in shunt to said first named inductance, connections for operating the other of said tubes as a simulated inductance in shunt to said second named inductance, connections for biasing said tubes to substantially cut-off, and connections for controlling the conductivity of the tubes differentially in accordance with signals.

14. In apparatus for modulating the frequency of operation of a generator of the type wherein a crystal is in shunt to the control grid to cathode impedance of an electron discharge device, the apparatus comprising an inductance and a capacity in parallel connected in series with the crystal, two electron discharge tubes, connections to electrodes in one of said tubes for operating the same as a simulated capacity in shunt to said first named capacity, connections to electrodes in the other of said tubes for operating the same as a simulated inductance in shunt to said first named inductance, and connections to said tubes for modulating the conductances thereof differentially in accordance wtih signals.

15. In apparatus for modulating the frequency of operation of a generator of the type wherein a crystal is in shunt to the control grid to cathode impedance of an electron discharge device, the apparatus comprising an inductance and a capacity in parallel connected in series with the crystal, two electron discharge tubes, connections to electrodes in one of said tubes for operating the same as a simulated capacity in shunt to said first named capacity, connections to electrodes in the other of said tubes for operating the same as a simulated inductance in shunt to said first named inductance, connections to said tubes for modulating the conductances thereof differentially in accordance with signals to correspondingly swing the frequency of operation of the generator, and an inductance in shunt to the crystal for extending the crystal characteristic to thereby extend the range through which the operation of the generator may be swung in accordance with the signals.

16. In apparatus for controlling the frequency of operation of a tube generator of the type wherein a tube has a control grid and cathode with a piezo-electric crystal in series between the control grid and cathode and an anode coupled to the cathode by a circuit parallel tuned to a frequency slightly above the natural fundamental frequency of the crystal, an inductance in series with the crystal, an inductance in shunt to the crystal and inductance in series, two-tube reactances each having output electrodes, between which an inductive reactance effect is developed of a value depending on the current through the tube reactance, leads coupling the output electrodes of one tube reactance in shunt to one inductance, leads coupling the output electrodes of the other tube reactance in shunt to the other inductance, and connections for varying the alternating current through the two additional tubes in accordance with control potentials.

17. In apparatus for controlling the frequency of operation of a generator of the type wherein a crystal is in shunt to the control grid to cathode impedance of an electron discharge device, the apparatus comprising an inductance connected with said crystal for altering the operating frequency versus reactance characteristic of the crystal, a tube having an anode coupled to a point of high radio frequency potential on said inductance and having a grid coupled to its anode by a phase shifting network, and having a cathode coupled to a point of low radio frequency potential on said inductance so that the tube and its connections provide a simulated reactance in shunt to said first named inductance of a value depending upon the tube conductance, and connections from a controlling potential source to an electrode of said tube for controlling the tube conductance in accordance with the control potentials to thereby vary the value of said simulated reactance and the point of operation of the crystal on its frequency versus reactance characteristic.

PAUL D. GERBER.

REFERENCES CITED

The following references are of record in the file of this patent:

UNITED STATES PATENTS

| Number | Name | Date |
|---|---|---|
| 1,795,204 | Espenschied | Mar. 3, 1931 |
| 1,827,843 | Green | Oct. 20, 1931 |
| 1,875,347 | Meissner | Sept. 6, 1932 |
| 1,953,140 | Trouant | Apr. 3, 1934 |
| 1,968,617 | Osnos | July 31, 1934 |
| 2,037,171 | Lane | Apr. 14, 1936 |
| 2,045,991 | Mason | June 30, 1936 |
| 2,133,648 | Pierce | Oct. 18, 1938 |
| 2,216,541 | Och | Oct. 1, 1940 |
| 2,222,417 | Mason | Nov. 19, 1940 |
| 2,264,764 | Koerner | Dec. 2, 1941 |
| 2,298,436 | Usselman | Oct. 13, 1942 |
| 2,298,437 | Usselman | Oct. 13, 1942 |
| 2,298,438 | Usselman | Oct. 13, 1942 |
| 2,343,099 | Usselman | Feb. 29, 1944 |
| 2,343,633 | Baldwin | Mar. 7, 1944 |